(12) United States Patent
Hart et al.

(10) Patent No.: US 10,303,925 B2
(45) Date of Patent: May 28, 2019

(54) OPTIMIZATION PROCESSES FOR COMPRESSING MEDIA CONTENT

(71) Applicant: Google LLC, Mountain View, CA (US)

(72) Inventors: Bryan Hart, Palm Beach Gardens, FL (US); Valentin Zulkower, Scotland (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/192,835

(22) Filed: Jun. 24, 2016

(65) Prior Publication Data

US 2018/0268567 A1    Sep. 20, 2018

(51) Int. Cl.
*G06K 9/00* (2006.01)
*G06T 7/90* (2017.01)
(Continued)

(52) U.S. Cl.
CPC ......... *G06K 9/00234* (2013.01); *G06F 16/41* (2019.01); *G06F 16/43* (2019.01); *G06F 16/434* (2019.01); *G06F 16/44* (2019.01); *G06F 16/51* (2019.01); *G06F 16/5854* (2019.01); *G06F 16/784* (2019.01); *G06F 16/9535* (2019.01); *G06K 9/00281* (2013.01); *G06N 20/00* (2019.01); *G06T 7/285* (2017.01);
(Continued)

(58) Field of Classification Search
CPC .. G06K 9/00624; G06K 9/00234; H04N 7/30; H04N 7/50; H04N 7/26244; H04N 7/26313; H04N 7/26106; G06T 7/90
See application file for complete search history.

(56) References Cited

U.S. PATENT DOCUMENTS 7,529,848 B2 * 5/2009 Miller ................. G11B 27/034
                                                    709/231
8,458,457 B2 * 6/2013 Parkinson ............. H04L 9/3294
                                                    380/30
(Continued)

FOREIGN PATENT DOCUMENTS

CN       102054033 A    5/2015
WO    WO 2009/047674 A2    4/2009

OTHER PUBLICATIONS

U.S. Appl. No. 14/862,095, filed Sep. 22, 2015.
(Continued)

*Primary Examiner* — Amir Alavi
(74) *Attorney, Agent, or Firm* — Dority & Manning, P.A.

(57) ABSTRACT

Various embodiments relate generally to a system, a device and a method for optimizing processes for compressing media content. An uncompressed content item is received in a media content management system. One or more parameters associated with the uncompressed content item are determined. A plurality of variants of the uncompressed content item is generated using the one or more parameters, the plurality of variants including one or more compressed content items. A candidate set comprising at least one of the one or more compressed content items is determined from the plurality of variants based on one or more filtering factors. A validated compressed content item is selected from the candidate set based on one or more validation criteria, and the validated compressed content item is stored in a database in the media content management system.

19 Claims, 8 Drawing Sheets

(51) Int. Cl.
*H04L 29/06* (2006.01)
*G06T 13/80* (2011.01)
*G06N 20/00* (2019.01)
*G06F 16/43* (2019.01)
*G06F 16/44* (2019.01)
*G06F 16/51* (2019.01)
*G06F 16/432* (2019.01)
*G06F 16/783* (2019.01)
*G06F 16/583* (2019.01)
*G06F 16/9535* (2019.01)
*G06T 7/285* (2017.01)
*G06T 11/60* (2006.01)
*G06T 13/40* (2011.01)
*G06F 16/41* (2019.01)
*G06F 3/0484* (2013.01)
*G06F 3/0489* (2013.01)

(52) U.S. Cl.
CPC .............. *G06T 7/90* (2017.01); *G06T 11/60* (2013.01); *G06T 13/40* (2013.01); *G06T 13/80* (2013.01); *H04L 69/04* (2013.01); *G06F 3/0489* (2013.01); *G06F 3/04842* (2013.01); *G06T 2207/10016* (2013.01); *G06T 2207/10024* (2013.01); *G06T 2207/20221* (2013.01); *G06T 2207/30201* (2013.01); *G06T 2210/12* (2013.01)

(56) References Cited

U.S. PATENT DOCUMENTS

| | | | |
|---|---|---|---|
| 9,519,723 B2 | 12/2016 | Lorenz et al. | |
| 9,596,206 B2 | 3/2017 | Bueno et al. | |
| 2002/0156743 A1* | 10/2002 | DeTreville | G06Q 30/02 705/57 |
| 2004/0059918 A1* | 3/2004 | Xu | G10L 19/018 713/176 |
| 2005/0060643 A1 | 3/2005 | Glass et al. | |
| 2011/0144801 A1 | 6/2011 | Selker et al. | |
| 2012/0170667 A1* | 7/2012 | Girardeau, Jr. | H04N 7/50 375/240.25 |
| 2013/0050747 A1 | 2/2013 | Cok et al. | |
| 2013/0208984 A1* | 8/2013 | Mase | G06K 9/00624 382/190 |
| 2014/0184841 A1 | 7/2014 | Woo et al. | |
| 2014/0244621 A1 | 8/2014 | Lindsay | |
| 2014/0280113 A1 | 9/2014 | Hohwald | |
| 2015/0100537 A1 | 4/2015 | Grieves et al. | |
| 2015/0127453 A1 | 5/2015 | Tew et al. | |
| 2016/0057576 A1 | 2/2016 | Kessler et al. | |
| 2016/0073166 A1 | 3/2016 | Hu et al. | |
| 2017/0083519 A1 | 3/2017 | McIntosh et al. | |
| 2017/0083520 A1 | 3/2017 | McIntosh et al. | |
| 2017/0083524 A1 | 3/2017 | McIntosh et al. | |
| 2017/0083586 A1 | 3/2017 | McIntosh et al. | |
| 2017/0193280 A1 | 7/2017 | Huang et al. | |
| 2017/0212892 A1 | 7/2017 | McIntosh et al. | |
| 2018/0068475 A1 | 3/2018 | Blue et al. | |

OTHER PUBLICATIONS

U.S. Appl. No. 15/043,612, filed Feb. 14, 2016.
U.S. Appl. No. 14/862,111, filed Sep. 22, 2015.
U.S. Appl. No. 14/862,114, filed Sep. 22, 2015.
U.S. Appl. No. 15/402,208, filed Jan. 9, 2017.
U.S. Appl. No. 15/260,296, filed Sep. 8, 2016.
U.S. Appl. No. 15/402,189, filed Jan. 9, 2017.
U.S. Appl. No. 15/909,924, filed Mar. 1, 2018.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Jou et al., "Predicting Viewer Perceived Emotions in Animated GIFs", Nov. 3-7, 2014 (4 pages).
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Forouharnejad, Faezeh, Office Action for U.S. Appl. No. 14/862,095 dated Jan. 9, 2018.
Forouharnejad, Faezeh, Office Action for U.S. Appl. No. 14/862,111 dated Jan. 9, 2018.
Forouharnejad, Faezeh, Office Action for U.S. Appl. No. 14/862,114 dated Dec. 29, 2017.
Le, Sarah, Office Action for U.S. Appl. No. 15/260,296 dated Feb. 22, 2018.

* cited by examiner

OPTIMIZATION PROCESSES FOR COMPRESSING MEDIA CONTENT

CROSS-REFERENCE TO RELATED APPLICATIONS

This application is related to a U.S. Non-Provisional patent application Ser. No. 15/043,612 , filed Feb. 14, 2016, which is a continuation-in-part of U.S. Non-Provisional patent application Ser. No. 14/862,095 filed Sep. 22, 2015, which is related to a U.S. Non-Provisional patent application Ser. No. 14/862,111 , filed Sep. 22, 2015, which is related to a U.S. Non-Provisional patent application Ser. No. 14/862, 114 , filed Sep. 22, 2015. All of the above-referenced properties are herein incorporated by reference in their entirety for all purposes.

FIELD

Various embodiments relate generally to electrical and electronic hardware, computer software, wired and wireless network communications, and distributed software applications for enabling users to communicate with each other through graphical, or pictorial, content. More specifically, a system and a method provide for optimizing a process of compressing media content items to implement, for example, animated inputs in a dynamic interface.

BACKGROUND

Conventional techniques for communicating among people have evolved away from mere pen-and-paper implementations as complex and creative messaging have increasingly relied on technological solutions. With the advent of computing devices, people communicate on the Internet in a multitude of ways through a multitude of platforms using a multitude of devices.

For example, some conventional approaches for communicating between users of mobile devices may simply rely on SMS, messaging through a social networking application, or "texting." Internet or mobile device users may exchange messages through these various mediums, for example. However, occasionally, users may wish to communicate via media content, such as GIFs (Graphics Interchange Format), or image files that include a static or animated set of images. Users may search the Internet for GIFs, manually download them through an operating system's native web browser, and upload the downloaded GIFs in a message through various messaging applications. These conventional systems are not well-suited to present multiple images within a dynamic interface, including animated imagery or motion.

While conventional approaches are functional, the usual structures and/or functionalities for presenting media content are not suited to the increasing technological demands required to optimally share expressive content.

Thus, what is needed is a solution for effectively displaying media content without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Communicating with other people in the Internet age has never been easier. People may communicate through various messaging platforms, including, but not limited to, SMS, iMessage, social networking systems such as FACEBOOK and TWITTER, as well as other messaging applications like SNAPCHAT, WECHAT, LINE, and so forth. While text messaging remains the predominate method of communication, more and more pictorial messaging has emerged. Pictorial messaging, or sending messages that include pictorial content, is just emerging as a method of conveying information from one person to another. Pictorial content is usually originally formatted as a video file. Traditional compression techniques transform a pictorial content item into an animated GIF (Graphical Interchange Format) content item. However, these conventional methods often do not reduce the file size of the content item to enable fast loading of the GIFs in a mobile interface. Additionally, users have traditionally used search engines and browsers to find the right GIF that matches the messaging that the communicating user wishes to convey. This process is cumbersome and does not yield a great user experience. After browsing through the search results, the communicating user must then copy and paste the content item into the desired messaging platform on the user device. This process is burdensome and not optimized for the user to quickly locate, download and message compressed content items that match the user's expressive intent.

Other methods of procuring content involve highly manual procedures, such as copying and storing uncompressed video content in a user's personal mobile device or computer. These methods also do not facilitate compressing content. Further, existing systems and methods do not provide compressed content in a dynamic interface as animated inputs on a user device.

Figure 1A:
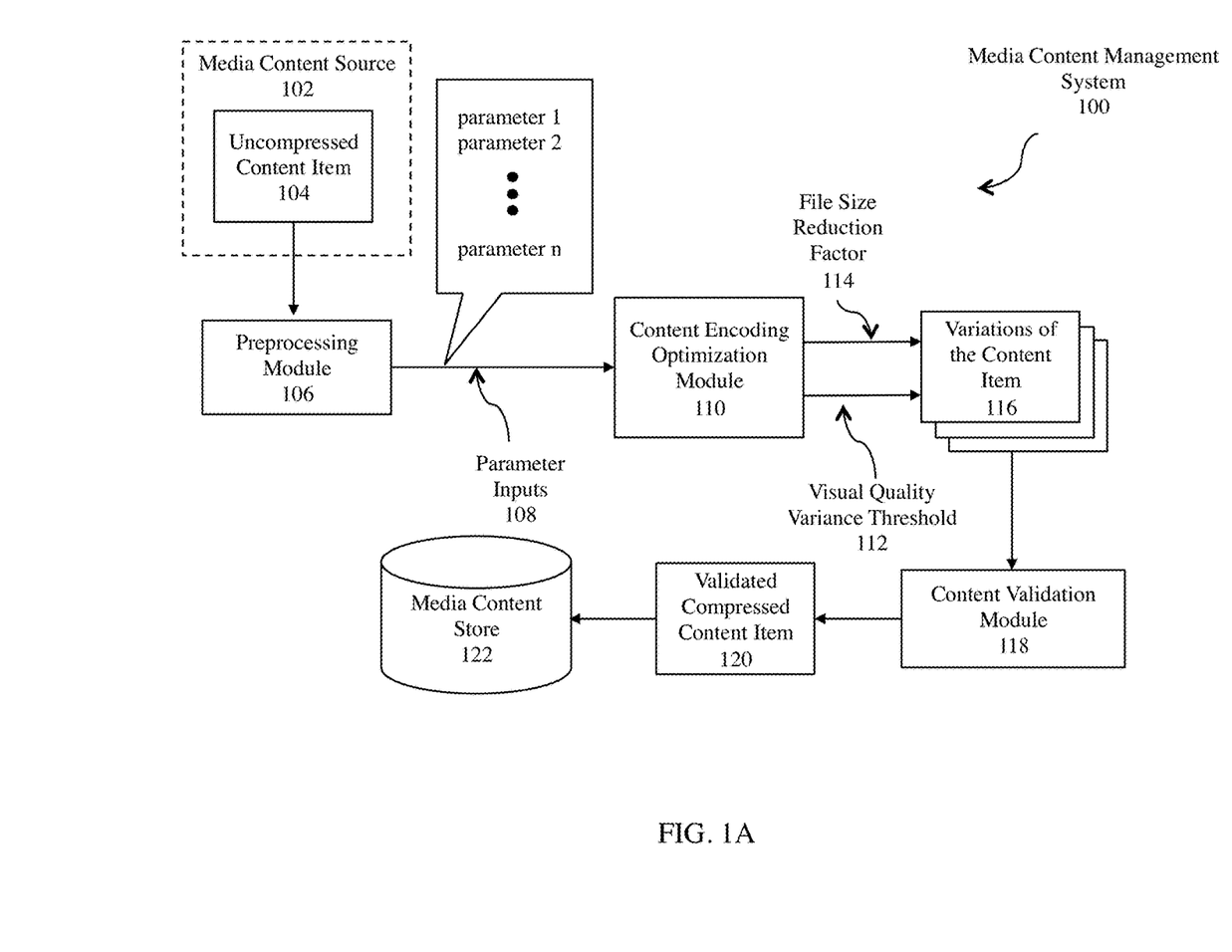
FIG. 1A is a high-level block diagram depicting a process of optimizing compression of media content items in a media content management system, according to an embodiment.

FIG. 1A is a high-level block diagram depicting a process of optimizing compression of media content items in a media content management system 100, according to some embodiments. The media content management system 100 may receive an uncompressed content item 104 from a media content source 102. FIG. 1A and the other figures use like reference numerals to identify like elements. A letter after a reference numeral, such as "108a," indicates that the text refers specifically to the element having that particular reference numeral. A reference numeral in the text without a following letter, such as "108," refers to any or all of the elements in the figures bearing that reference numeral (e.g., "108" in the text may refer to reference numerals "108a" and/or "108b" in the figures). Only one uncompressed content item 104 is illustrated in FIG. 1A in order to simplify and clarify the description, though multiple uncompressed content items 104 may be received from a media content source 102. Parameter inputs 108 associated with an uncompressed content item 104 may be identified by a preprocessing module 106, in one embodiment.

As mentioned above, uncompressed content items 104 may include various types of content, such as animated GIFs (a series of images), a static image, an audio-visual content item/video, as well as composite content items, such as multiple animated GIFs and/or image content. Although GIFs may go through traditional compression methods, they may remain uncompressed content items 104 as compared to the novel and innovative compression methods described herein. Uncompressed content items 104 are received to the media content management system 100 and preprocessed at a preprocessing module 106. An uncompressed content item 104 may have one or more parameters, such as noise, sharpness, smoothness, resolution, color fidelity and so forth. Parameters may be determined by a preprocessing module 106, in one embodiment. In one embodiment, a preprocessing module 106 may perform one or more processes to optimize a compression of a content item 104. In another embodiment, a preprocessing module 106 may identify the one or more parameters inputs 108 for a content encoding optimization module 110. In a preprocessing module 106, an uncompressed content item 104 may be analyzed to determine the one or more parameter inputs 108.

In one embodiment, a user of the media content management system 100 may, through a user device, add content to a media content management system 100. For example, a user may have installed an application extension onto the user device such that the user can "save" a content item found through browsing a web page using a browser on the user device. The application extension may, in one embodiment, include a downloadable application that enables a user to browse to a web page and collect media content items presented on the web page. As an example, a web page for a blog may post a particularly interesting content item that may or may not be available on the media content management system 100. Using the application extension, the user may browse to the web page, access a menu through the browser, and select an option to save one or more content items that have been presented on the web page. In one embodiment, the application extension is a mobile application that enables mobile browsers to perform this functionality. In other embodiments, the application extension may be a browser extension application or applet that may be downloaded through the browser on a mobile device or desktop computer. In a further embodiment, the application extension may enable users to directly upload content items to the media content management system 100.

Content items, presented on web pages or otherwise accessible through web servers, may be procured by administrators of the media content management system 100 in other ways, in an embodiment. For example, content owners, such as movie studios, television studios, brand owners, and other content generators, may partner with administrators of the media content management system 100 such that licensed content may be delivered to the media content management system 100. In such a procurement process, content owners may provide uncompressed content items 104 having parameters, as mentioned above. A media content source 102, such as a content owner, may include content stores or databases on servers maintained and operated by the third-party sources or websites, for example. As part of the procurement process, uncompressed content items 104 may be analyzed to determine the one or more parameter inputs 108.

A content encoding optimization module 110 receives the content item 104 and the parameter inputs 108 to encode the content item as a GIF, in one embodiment. Using different values of the parameter inputs 108, a content encoding optimization module 110 may generate multiple variations of the content item 116. For example, if there are five parameter inputs 108, a five dimensional matrix may be generated in association with the content item 104, where the matrix includes unique values associated with the parameter inputs 108. The number of variations of the content item 116 may be limited by a visual quality variance threshold 112 and/or a file size reduction factor 114. For example, a visual quality variance threshold 112 may include one or more values that enable comparison of a compressed content item and an uncompressed content item, such as sharpness, smoothness, color fidelity, and noise quality. A threshold value may be predetermined based on the perceptibility of visual quality, as determined by administrators of the media content management system 100. For example, a 5% change in smoothness may be imperceptible to most users of the media content management system 100, but a 10% change in noise quality may be perceptible by humans.

A file size reduction factor 114 may include a threshold for file size reduction. For example, if an uncompressed content item 104 is 50 megabytes (MB) and after compression the content item's file size is 50 kilobytes (KB), there has been a percentage reduction that can be expressed as a value. The file size reduction factor 114 may include a threshold value for the reduction in size such that combinations of parameters that do not yield at least that threshold value are thrown out. Using the file size reduction factor 114 and the visual quality variance threshold 112, the number of variations of the content item 116 may be reduced. The candidate set of variations 116 may include 10 compressed content items, for example. In one embodiment, a grid search optimization algorithm may be used by the content encoding optimization module 110 to generate the candidate set of variations of the content item 116 using the file size reduction factor 114 and the visual quality variance threshold 112 against the parameter inputs 108.

The variations of the content item 116 are sent to a content validation module 118, in one embodiment. The content validation module 118 may enable one or more administrators of the media content management system 100 to manually select which of the variations of the content item 116 to store in the media content store 122 as the validated compressed content item 120. In one embodiment, a user interface is presented to the one or more administrators that renders the variations of the content item 116. In a further embodiment, the content validation module 118 may use user feedback in selecting a validated compressed content item 120. The selected validated compressed content item 120 may represent an optimal candidate item for various optimization algorithms to use as a performance metric. In yet another embodiment, the content validation module 118 may automatically select a validated compressed content item 120 from the candidate set variations of the content item 116 based on a maximum file size reduction and a minimum visual quality variance as compared to the uncompressed content item 104. The minimum visual quality variance may be a subjective threshold that is determined as a result of training an optimization algorithm using the selected validated compressed content item 120 as the optimal performance, in one embodiment, using the administrators' and/or users' feedback. In one embodiment, multiple files may be selected as validated compressed content items 120 to be stored in the media content store 122.

Figure 1B:
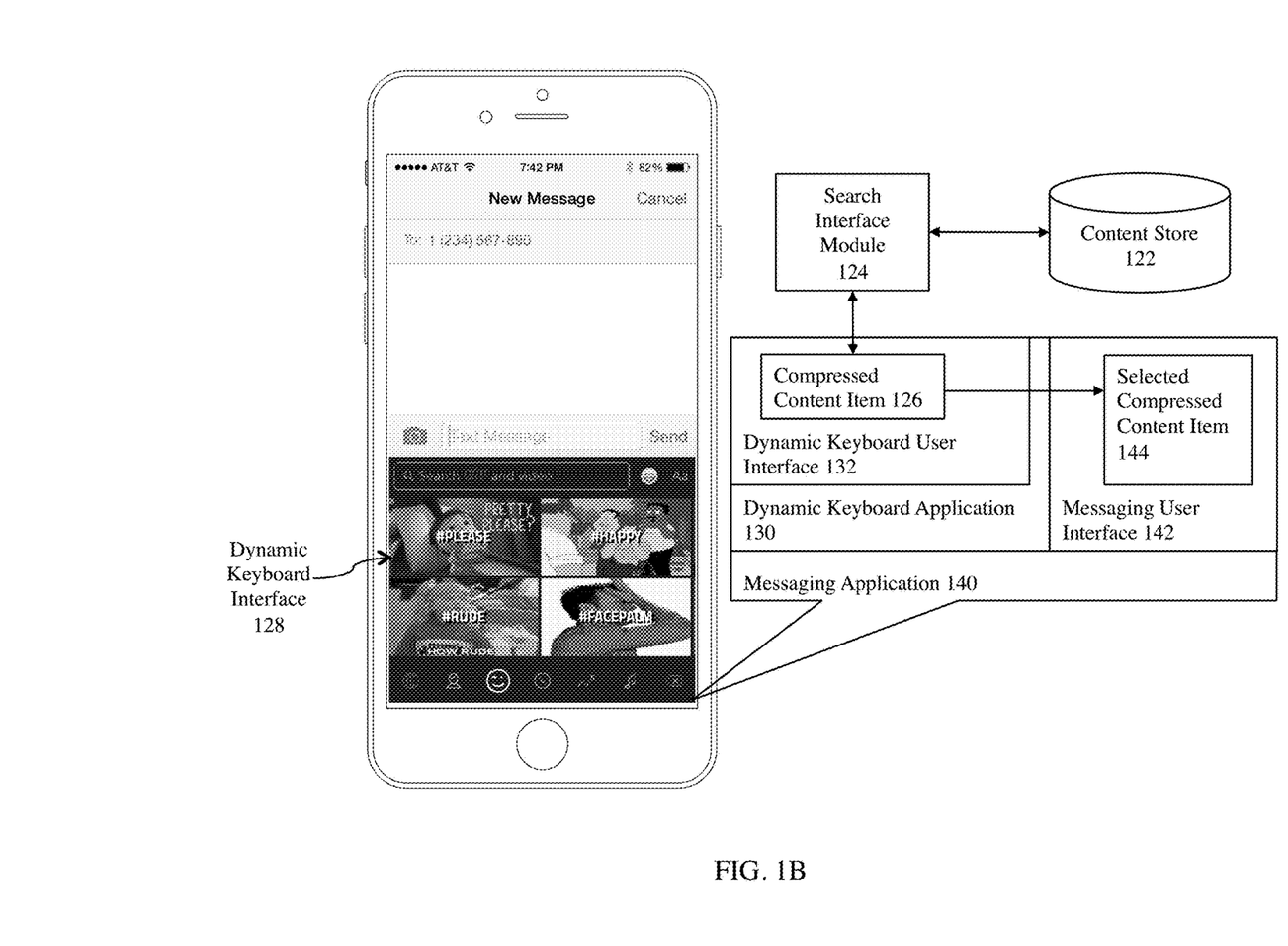
FIG. 1B is a high-level block diagram depicting a process of performing a search to implement animated inputs in a dynamic interface using compressed media content items, according to an embodiment.

As illustrated in FIG. 1B, a dynamic keyboard user interface 132 may be rendered on a user device through a dynamic keyboard application 130 installed on the user device. The dynamic keyboard application 130 may install a dynamic keyboard user interface 132 that enables a dynamic keyboard interface 128 to be accessed throughout the user device as a third-party keyboard. In this way, a messaging user using a messaging application 140, such as the APPLE IMESSAGE, SMS, texting, or other messaging platform such as FACEBOOK MESSAGER, TWITTER, EMAIL, and the like, may access the dynamic keyboard interface 128 from within the messaging application 140.

FIG. 1B is a high-level block diagram depicting a process of performing search to implement animated inputs in a dynamic interface using compressed media content items, in an embodiment. As further illustrated in FIG. 1B, compressed media content items, the validated compressed content items 120 are rendered in the dynamic keyboard interface 128 through the dynamic keyboard user interface 132 communicating with the search interface module 124. In one embodiment, a set of collections may be selected for display on the dynamic keyboard interface 128. As illustrated in FIG. 1B, the dynamic keyboard interface 128 includes "#PLEASE," "#HAPPY," "#RUDE," and a "#FACEPALM" collections. Although the hashtag symbol ('#') is used in the examples included here, content associations do not necessarily need to start with a hashtag. By selecting an animated key on the dynamic keyboard interface 128, the collection of validated compressed content items 120 may be retrieved from the media content store 122 by the search interface module 124 and then rendered by the dynamic keyboard user interface 132 in the dynamic keyboard interface 128. In this way, the searching user is searching the media content management system 100 by using the selected content association, such as "#HAPPY." The retrieved collection of media content items 104 may be rendered within the dynamic keyboard interface 128. Because the "#HAPPY" collection may be updated and added to in real-time, a searching user may be presented with different media content items as new items are added to the collection. As mentioned above, media content items may be preprocessed to reduce the file size of the content, thus enabling the media content items to be quickly rendered on the dynamic keyboard interface 128.

A searching user may then select a compressed content item 126 from the dynamic keyboard interface 128 by touching or otherwise interacting with the dynamic keyboard user interface 132. The selected compressed content item 144 may then be transmitted or pasted into the messaging user interface 142 of the messaging application 140. In one embodiment, a selected compressed content item 144 is selected by clicking, tapping, or touching the dynamic keyboard interface 128 and holding the selected media content item 144 to "copy" the content so that it can be "pasted" into the messaging application 140 through the messaging user interface 142. This copy and paste method may take advantage of the operating system of the user device, in one embodiment, such that the selected compressed content item 144 is not stored permanently onto the user device. In another embodiment, a searching user may search for media content through a search field on the dynamic keyboard interface 128, described in the related applications mentioned above and incorporated by reference. In this way, uncompressed content items 104 may be compressed on the media content management system 100 and then retrieved and shared as compressed content items 126 through any messaging platform available on the user's device. Another benefit of the methods and systems described herein is to provide multiple different animated images representing a communication concept, such as an emotion, a reaction, an emoji depicting the communication concept, and so forth, such that the animated images may be loaded into a client device's memory to effect rapid loading of animated images as "keys" of the dynamic keyboard interface as a group of keys shown, in animation, simultaneously. In at least some embodiments, a dynamic keyboard interface 128 can be implemented as a GIF keyboard, as produced by RIFFSY, INC. of San Francisco, Calif.

System Architecture

Figure 2:
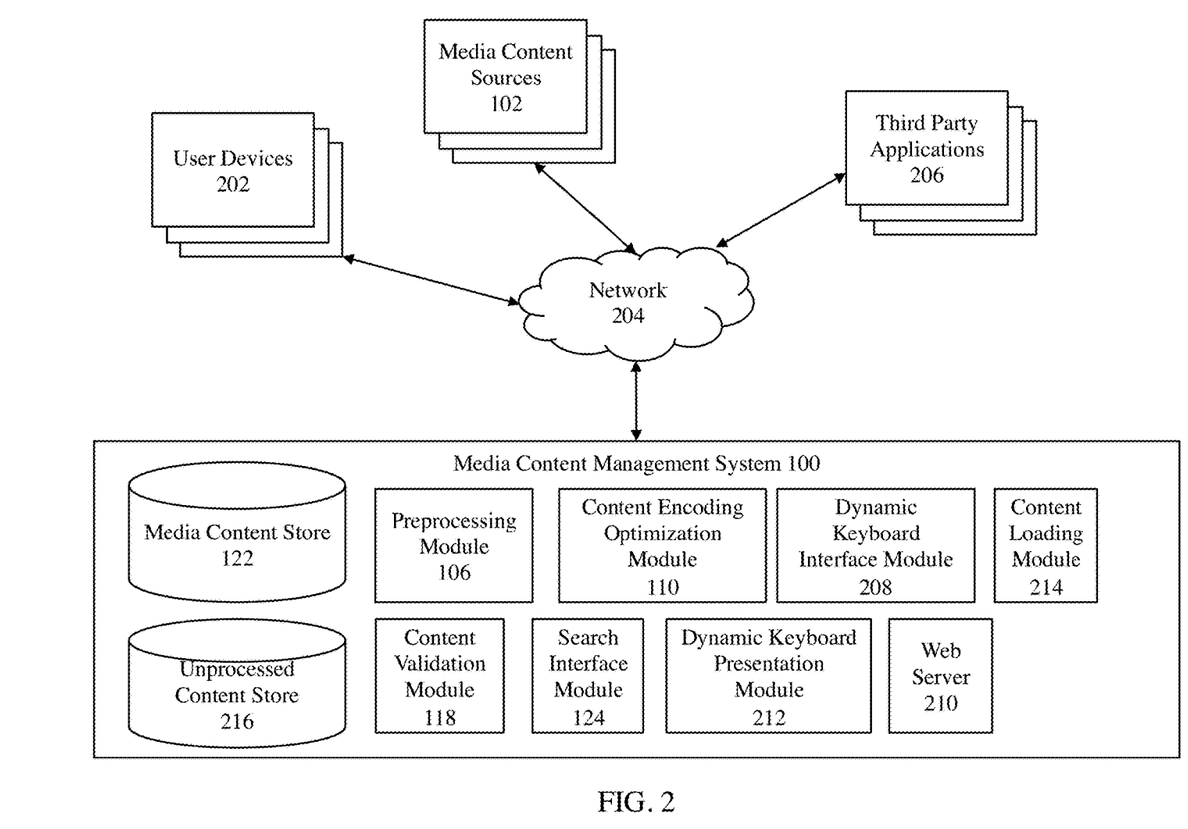
FIG. 2 is a network diagram of a system for optimizing processes for compressing media content in a media content management system, showing a block diagram of the media content management system, according to an embodiment.

FIG. 2 is a network diagram of a system for optimizing processes for compressing media content in a media content management system, showing a block diagram of the media content management system, according to an embodiment. The system environment includes one or more user devices 202, media content sources 102, third-party applications 206, the media content management system 100, and a network 204. In alternative configurations, different and/or additional modules can be included in the system.

The user devices 202 may include one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, wearable device, etc. The user device 202 is configured to communicate via network 204. The user device 202 can execute an application, for example, a browser application that allows a user of the user device 202 to interact with the media content management system 100. In another embodiment, the user device 202 interacts with the media content management system 100 through an application programming interface (API) that runs on the native operating system of the user device 202, such as iOS and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Dacontent associationram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the media content management 100. The media content management system 100 includes a media content store 122, an unprocessed content store 216, a search interface module 124, a preprocessing module 106, a content encoding optimization module 110, a content validation module 118, a dynamic keyboard interface module 208, a web server 210, a dynamic keyboard presentation module 212, and a content loading module 214. In other embodiments, the media content management system 100 may include additional, fewer, or different modules for various applications. Conventional components such as network interfaces, security functions, load balancers, failover servers, management and network operations consoles, and the like are not shown so as to not obscure the details of the system.

The web server 210 links the media content management system 100 via the network 204 to one or more user devices 202; the web server 210 serves web pages, as well as other web-related content, such as Java, Flash, XML, and so forth. The web server 210 may provide the functionality of receiving and routing messages between the media content management system 100 and the user devices 202, for example, instant messages, queued messages (e.g., email), text and SMS (short message service) messages, or messages sent using any other suitable messaging technique. The user can send a request to the web server 210 to upload information, for example, images or media content are stored in the media content store 122. Additionally, the web server 210 may provide API functionality to send data directly to native user device operating systems, such as iOS, ANDROID, webOS, and RIM.

A content loading module 214 may automatically load one or more uncompressed content items 104 to the media content management system 100 and store them in an unprocessed content store 216. In one embodiment, third-party applications 206 may be used to perform the loading functionality called by the content loading module 214. In another embodiment, a content loading module 214 may use various open-source tools, such as FFMPEG, to load content items to the media content management system 100.

A content validation module 118 may automatically select a validated compressed content item 120 from a candidate set of variations of a content item, as described with respect to FIG. 1A. For example, machine learning techniques may be used by the content validation module 118 to an optimal content item having an optimal file size reduction and optimal visual threshold variance. Machine learning techniques such as regression analysis may use user feedback data, such as up/down votes, to classify variations of the content item and tune the optimal file size reduction and visual quality variance values for the parameters inputs, in one embodiment. In an embodiment, the content validation module 118 may identify one or more media content sources 102, such as movie studios, movies, television studios, television shows, actors, genres, and so forth. In another embodiment, the content validation module 118 may assign a separate visual quality variance threshold for certain media content sources 102 based on whether the content is sponsored content. As a result, a higher visual quality content item may be selected and used as the validated compressed content item 120 for sponsored content items based on an analysis of the image frames within the uncompressed content item 104.

In yet another embodiment, the content validation module 118 may use one or more computer vision techniques and other image processing methods through various third party applications 206 to analyze the image frames within the uncompressed content item 104 to automatically generate one or more parameter inputs 108, as described above with respect to FIG. 1A. In one embodiment, the content validation module 118 may utilize one or more third party applications 206 to analyze image frames of the candidate set variations of the content item 116 to automatically determine visual quality variances in comparison to the uncompressed content item 104.

A search interface module 124 may manage search requests and/or search queries for validated compressed content items 120 in the media content management system 100 received from user devices 202, in an embodiment. A search query may be received at the search interface module 124 and processed, in one embodiment. In another embodiment, a search interface module 124 may receive a request for a collection from a user device 202 based on a user interface selection in the dynamic keyboard interface 128, such as "#HAPPY," "#RUDE," "#FOMO," and so forth as a result of a selection of an animated key or a text search. The search interface module 128 may communicate the search query to the search engine in the search interface module 124 to process the request, in an embodiment.

A dynamic keyboard interface module 208 may manage interface communications between the media content management system 100 and user devices 202. For example, the dynamic keyboard interface 128, as illustrated in FIG. 1B, may include a menu selection element that enables the searching user to view trending media content on the media content management system 100. "Trending" media content may include frequently viewed and/or frequently shared content by users of the media content management system 100. The dynamic keyboard interface module 208 may receive the request for trending media content and retrieve compressed content items 126 from the media content store 122 that have the highest number of shares in the past hour, for example. The dynamic keyboard interface module 208 may then, through the dynamic keyboard presentation module 212, provide the retrieved trending media content items to the dynamic keyboard interface 128 through the dynamic keyboard application 130, in one embodiment. The dynamic keyboard presentation module 212 may determine how the media content items are presented and in what order, for example. In one embodiment, if no media content items satisfy a search query or request from a user device, the dynamic keyboard interface module 208 may, in conjunction or in coordination with the search interface module 124, deliver other media content items 104 that are popular or have been shared. In one embodiment, content items may be selected by the dynamic keyboard interface module 208 from third party applications 206 (or websites), such as TUMBLR, to be included in the search results or animated keys of the dynamic keyboard interface 128.

A heuristics engine may be included in a content validation module 118 and may include one or more heuristics rules to determine one or more outcomes. For example, the content validation module 118 may use the heuristics engine to determine a ranking of candidate variations of the content item 116 based on the visual quality variance threshold 112 and the file size reduction factor 114. Various heuristic rules may be associated with one or both of the visual quality variance threshold 112 and the file size reduction factor 114, such as prioritizing higher visual quality for sponsored content and/or select media content sources 102, prioritizing larger file reduction size for frequently shared and/or viral content, and so forth. Various heuristic rules may be generated by administrators to automatically validate and/or select compressed content items based on the visual quality variance threshold 112 and the file size reduction factor 114, in one embodiment. In another embodiment, heuristic rules may also use ranges of values for the visual quality variance threshold 112 and the file size reduction factor 114. For example, thirty past selections of a media content item for sharing by a particular user may be used in a heuristic rule to compress the same media content item for other users that have similar characteristics to the particular user of the media content management system 100. The range here may be defined as a threshold number of shares, for example.

Preprocessing Content Items

Figure 3:
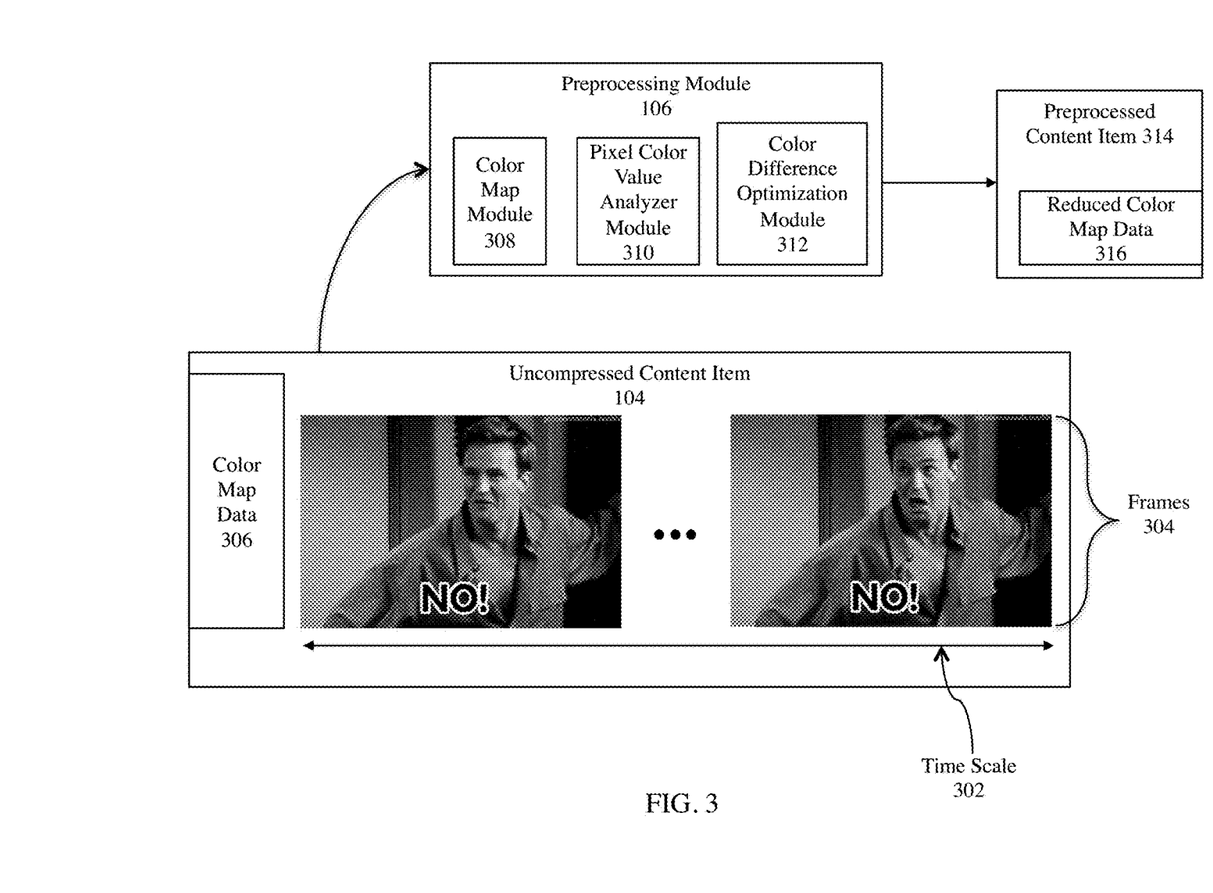
FIG. 3 is a high-level block diagram of a system for optimizing preprocessing of media content in a media content management system, according to an embodiment.

FIG. 3 is a high-level block diagram of a system for optimizing preprocessing of media content in a media content management system, according to an embodiment. An uncompressed content item 104 includes a plurality of frames 304 over a time scale 302 and color map data 306. As illustrated in FIG. 3, the uncompressed content item 104 includes example screenshots of two frames of the uncompressed content item 104. A preprocessing module 106 may receive the uncompressed content item 104. The preprocessing module 106 includes a color map module 308, a pixel color value analyzer module 310, and a color difference optimization module 312.

As part of the procurement process, media content items may be pre-processed before being stored in the media content store 122. This enables the content items to be retrieved quickly and rendered seamlessly in the dynamic keyboard interface 128 on a user device. Pre-processing of uncompressed content items 104 may include reducing pixel count, modifying resolution definition, and other file size reduction techniques. Beneficially, pre-processing of media content items enables a dynamic keyboard interface 128, presented to a user on a user device, to render at least two renderings of at least two media content items in animation and to display them concurrently in the dynamic keyboard interface 128. In an embodiment, the media content management system 100 may use a third party application 206, such as FFmpeg, to load an uncompressed content item 104. The preprocessing of the uncompressed content item 104 may decode the content item 104 into decoded frames 304.

As an uncompressed content item 104 is received in the media content management system 100 from a media content source 102, the preprocessing module 106 may analyze one or more components of the uncompressed content item 104. For example, an uncompressed content item 104 from the television show, "FRIENDS," may be automatically analyzed to determine the color map data 306 associated with the uncompressed content item 104. In one embodiment, a color map module 308 of the preprocessing module 106 may retrieve and analyze the color map data 306 associated with the uncompressed content item 104. In another embodiment, a color map module 308 may use a third party application 206 to determine color map data 306 to be associated with the uncompressed content item 104. Color map data 306 may include a map of color values of each frame 304 in the uncompressed content item 104, in one embodiment.

A pixel color value analyzer module 308 may identify, for each frame 304 in the uncompressed content item 104, a color value for each pixel in each frame 304. A color value for each pixel may be an eight-bit (8-bit) value for each channel, red, blue, and green (RGB model), in one embodiment. As a result, there are 256 values for each channel, or a 24-bit range of color values for MPEG and JPEG data files. For higher quality color values, the pixel color value analyzer module 308 may reduce the color gamut of the image by assigning the closest color value for each pixel. GIF files, in contrast have 256 colors (8-bit). The best 256 colors for a frame are included in a color map, in one embodiment, as stored in color map data 306.

A color difference optimization module 312 may analyze each frame 304 of the uncompressed content item 104, pixel by pixel, to determine a difference in color value, in one embodiment. If the difference in color value for a pixel, across the time scale 302 among the frames 304, is less than a predetermined threshold, the difference is eliminated to use the same color value for the pixel across the time scale 302 among the frames 304. In another embodiment, the differences in color values are optimized from frame to frame for each pixel. The color difference optimization module 312 may change the mapping of the color values in the color map data 306 to form a new mapping of color values for a reduced color map data 316 to be associated with a preprocessed content item 314. The benefits of the reduced color map data 316 may be a reduction in the file size of the content item 104.

Figure 4:
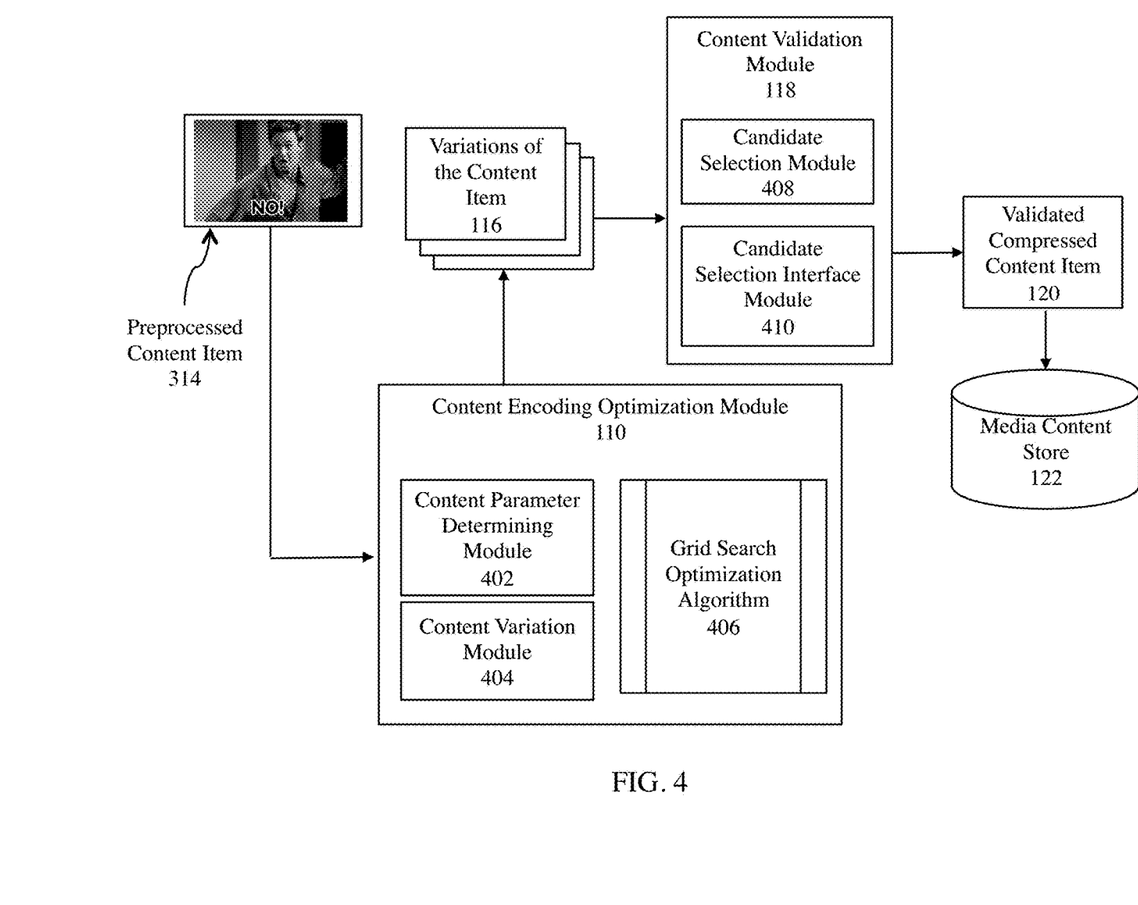
FIG. 4 is a high-level block diagram of a system for optimizing encoding of media content in a media content management system, according to some examples.

FIG. 4 is a high-level block diagram of a system for optimizing encoding of media content in a media content management system, according to some examples. A content encoding optimization module 110 may include a content parameter determining module 402, a content variation module 404, and a grid search optimization algorithm 406. The content encoding optimization module 110 may operate in conjunction with or include other functions to aide in determining parameters for a preprocessed content item 314, in one embodiment. The output of the content encoding optimization module 110 may include variations of the content item 116 that are input to a content validation module 118 that includes a candidate selection module 408 and a candidate selection interface module 410. The content validation module 118 may then generate at least one validated compressed content item 120 to be stored in a media content store 122.

A content encoding optimization module 110 may use a content parameter determining module 402, a content variation module 404, and a grid search optimization algorithm 406 to optimize the process of encoding of content items in a GIF file, in an embodiment. A content parameter determining module 402 may determine one or more parameter inputs 108, such as a noise parameter, smoothness parameter to detect jitter in a content item, sharpness parameter to detect detail in frame images, and color fidelity parameter, associated with a preprocessed content item 314, for example. In one embodiment, a content encoding optimization module 110 may determine one or more parameter inputs 108 that are associated with a received uncompressed content item 104.

A content variation module 404 may generate a variant of the uncompressed content item 104 based on the one or more parameter inputs 108. For example, a grid of variants may be generated. For example, if there are five parameter inputs 108, a five-dimensional grid of variants may be generated. The number of variants may be optimized using a grid search optimization algorithm 406. In machine learning, a grid search optimization algorithm 406 may be used to do an exhaustive search of a grid of selected parameters. Parameters may include one or more of sharpness, smoothness, color fidelity, and noise quality. Using different values of the parameters, multiple variations of the content item, or variants, may be generated. For example, if there are five parameters, a five dimensional matrix may be generated in association with the uncompressed content item 104, where the matrix includes unique values associated with the parameters. The grid search optimization algorithm 406 may, using the values of the five dimensional matrix, train a machine learning classifier with each 5-value combination in a product of the five sets and evaluate their performance on a held-out validation set. Finally, the grid search optimization algorithm 406 outputs the settings that achieved the highest score in the validation procedure. The highest score, or range of scores, that is achieved for a selected 5-value combination may be a range of values, in one example. For example, a visual quality variance threshold 112 may include one or more values that enable comparison of a compressed content item and an uncompressed content item, such as sharpness, smoothness, color fidelity, and noise quality. A threshold value may be predetermined based on the perceptibility of visual quality, as determined by administrators of the media content management system 100. For example, a 5% change in smoothness may be imperceptible to most users of the media content management system 100, but a 10% change in noise quality may be perceptible by humans. A file size reduction factor 114 and a visual quality variance threshold 112 may be used by the grid search optimization algorithm 406 in one embodiment to establish local minimum(s) and/or local maximum(s), thus limiting the number of variants.

A content validation module 118 includes a candidate selection module 408 and a candidate selection interface module 410 to validate a compressed content item from a candidate set of variations of the content item 116. A candidate selection module 408 may use one or more machine learning techniques and/or heuristic rules to select an optimal content item based on an optimal set of parameter inputs. In one embodiment, a higher image quality may be required for a content item based on the content item being sponsored by an advertiser. As a result, the optimal set of parameter inputs for the sponsored content item may differ from a non-sponsored content item. In another embodiment, reducing the file size of the content item may be the more prioritized factor to deliver a more engaging user experience. A smaller file size may increase the use of the dynamic interface 128 because the compressed content item will be easier to download, copy, and share among messaging platforms. Machine learning techniques such as regression analysis may be used on user interactions with different content items that have different parameter inputs 108 to determine an optimal set of parameter inputs, in one embodiment. In another embodiment, a candidate selection interface module 410 may provide a user interface for manual selection of a validated compressed content item 120 by one or more administrators of the media content management system 100. Various methods of selection may be used by the candidate selection interface module 410, including selection from a user interface, voting mechanisms, and/or comparison mechanisms to select a validated compressed content item 120 from the candidate set of variations/variants of the content item 116.

Figure 5:
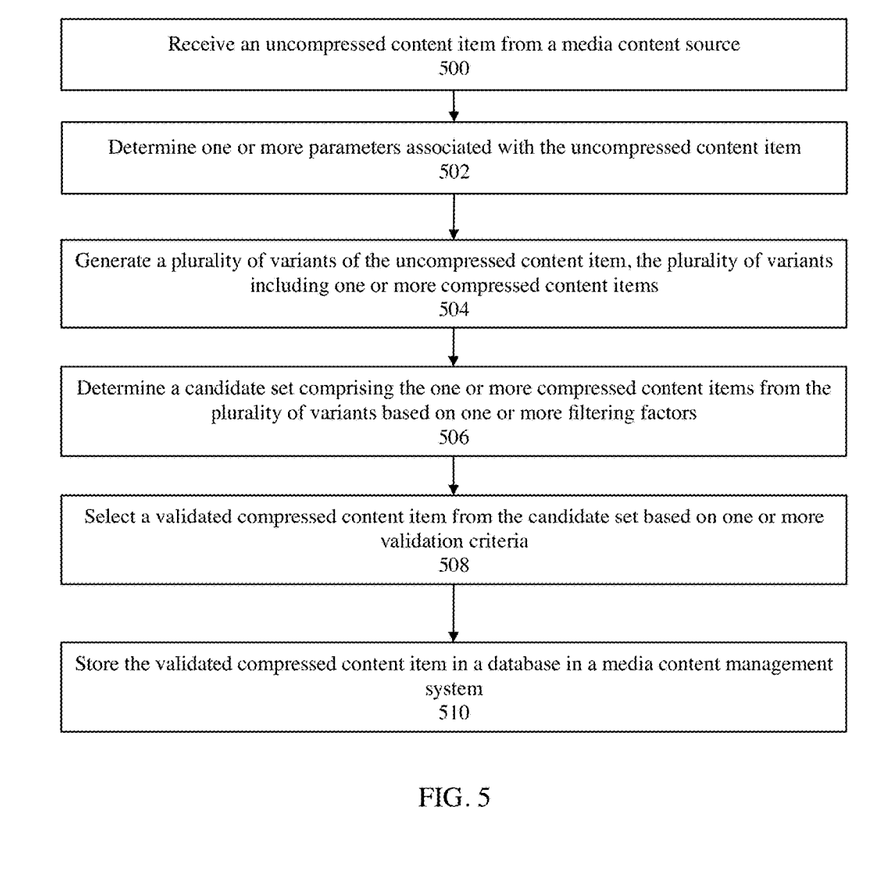
FIG. 5 is an example flowchart of a process for optimizing encoding of media content in a media content management system, according to some examples.

FIG. 5 is an example flowchart of a process for optimizing encoding of media content in a media content management system, according to some examples. An uncompressed content item is received 500 from a media content source. For example, an uncompressed content item may include a MPEG file or movie file. The uncompressed content item is received 500 at a media content management system 100 through one or more loading and/or preprocessing applications accessible by the media content management system 100. The uncompressed content item may be stored in a cache memory, in one embodiment, as it is received 500.

One or more parameters associated with the uncompressed content item are determined 502. For example, parameters such as a noise parameter, a smoothness parameter, a sharpness parameter, a color fidelity parameter, a brightness parameter, and/or other image quality parameters may be determined 502 using one or more image analyzing applications and/or modules accessible by the media content management system 100. In one embodiment, the one or more parameters associated with the uncompressed content item are determined 502 by identifying metadata associated with the content item after decoding packets and/or analyzing decoded image frames that comprise the content item.

A plurality of variants of the uncompressed content item are generated 504, where the plurality of variants include one or more compressed content items. The plurality of variants are generated 504 by using the one or more parameters to generate differing variants of the content item by changing the values of each of the one or more parameters for each variant. As a result, the file size of each variant may be reduced or otherwise compressed. A candidate set comprising the one or more compressed content items from the plurality of variants may be determined 506 using one or more filtering factors. For example, filtering factors may include a file size reduction factor/threshold percentage reduction. As another example, a filtering factor may include a visual quality variance threshold, such as minimizing the color value differential for a majority of pixels in each frame by having a floor color differential (e.g., 5% color value differential). Other types of filtering factors may be used as rules and/or programmed by administrators of the media content management system 100.

A validated compressed content item is selected 508 from the candidate set based on one or more validation criteria. In one embodiment, the validated compressed content item is selected 508 by one or more administrators of the media content management system 100 through a user interface. In another embodiment, computer vision and/or machine learning techniques may be used to select an optimal content item based on one or more validation criteria, such as meeting a threshold variance in visual quality in comparison to the uncompressed content item 104 and meeting a threshold requirement in file size reduction. The validated compressed content item is then stored 510 in a database in a media content management system.

Figure 6:
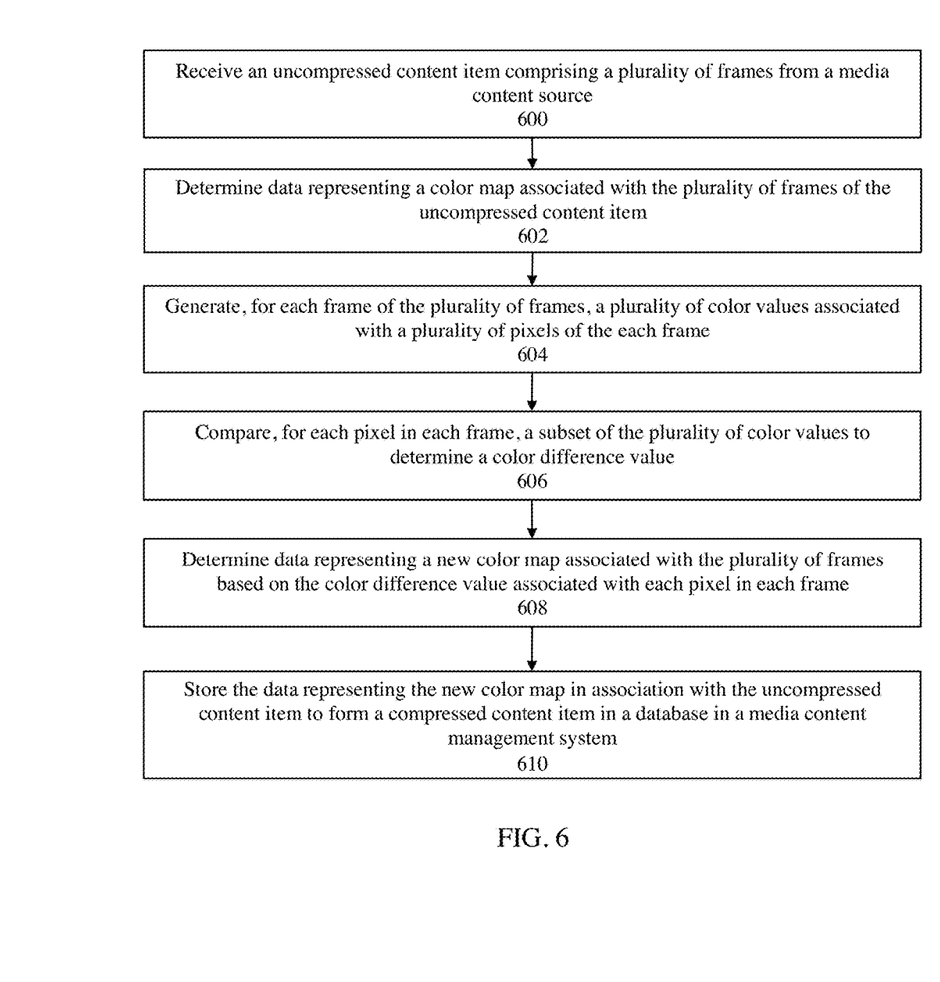
FIG. 6 is an example flowchart of a process for optimizing preprocessing of media content in a media content management system, according to some examples.

FIG. 6 is an example flowchart of a process for optimizing preprocessing of media content in a media content management system, according to some examples. An uncompressed content item comprising a plurality of frames is received 600 from a media content source. Data representing a color map associated with the plurality of frames of the uncompressed content item is determined 602. In one embodiment, the data representing the color map is determined 602 based on identifying the color map data as a metadata attribute of the decoded uncompressed content item. In another embodiment, the data representing the color map is determined 602 using one or more applications and/or modules accessible by the media content management system 100 to analyze a mapping of color values for each pixel of each frame of the plurality of frames. In a further embodiment, a color map may be determined 602 for each frame. In yet a further embodiment, a color map may be determined 602 for the plurality of frames of the uncompressed content item.

For each frame of the plurality of frames, a plurality of color values associated with a plurality of pixels of the each frame are generated 604. Color values, or color spaces, may be generated 604 based on the color map data, in one embodiment. In another embodiment, the plurality of color values associated with a plurality of pixels of each frame of the plurality of frames may include all pixels of the frames. In a further embodiment, a sampling of the pixels may be used as the plurality of pixels for each frame. In yet another embodiment, a sampling of all frames of the uncompressed content item may be used as the plurality of frames.

For each pixel in each frame, a subset of the plurality of color values are compared 606 to determine a color difference value. A pixel located in the same position across the plurality of frames that make up the content item may have one or more color values. A color difference value may include one or more difference values based on the changes in the color value of that pixel. The "motion" of the images and/or frames may thus be attributed to dramatic differences in color values for the pixels in the frames. However, a number of pixels may experience little or no difference in color value, thus the corresponding images may appear static in the movie file content item.

Data representing a new color map associated with the plurality of frames may be determined 608 based on the color difference value associated with each pixel in each frame. For those pixels that experience little or no difference in color value, corresponding to the "static" images in the content file, a new color mapping data may be determined 608 to reduce the file size of the content item. For example, a threshold level of color difference value (e.g., a level below which is imperceptible to the human eye) may be used to distinguish "static" images and "dynamic" or moving images as related to the pixel corresponding to the images. This elimination of color map data results in a large compression of the content item without sacrificing visual quality. The data representing the new color map is then stored 610 in association with the uncompressed content item to form a compressed content item in a database in a media content management system. The compressed content item is reduced in file size based on the smaller color map data. In one embodiment, this process may be implemented by a preprocessing module of the media content management system 100 and may operate in conjunction with the optimized encoding process described above with respect to FIG. 5.

Figure 7:
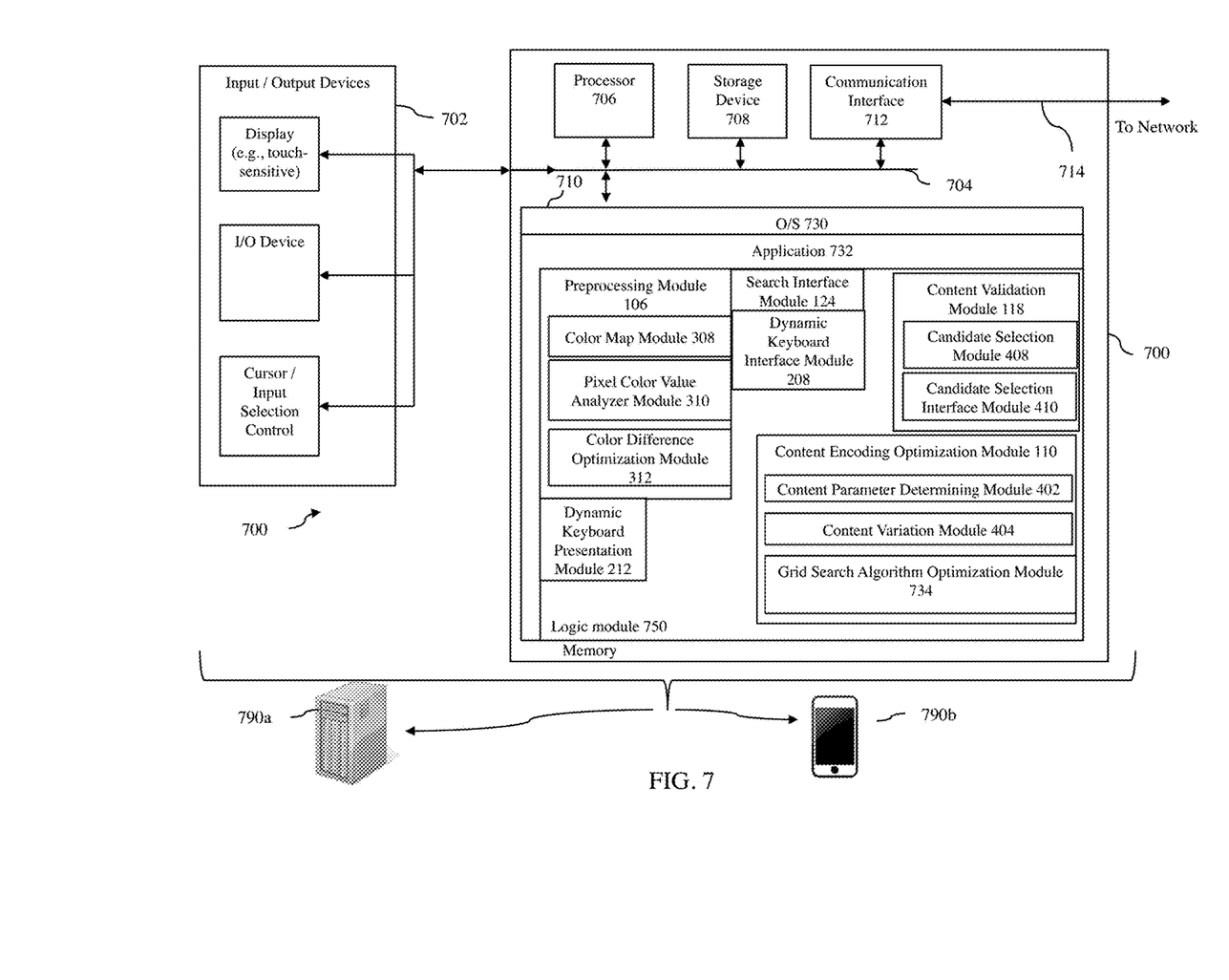
FIG. 7 illustrates an exemplary computing platform disposed in a device configured to optimize processes for compressing media content in accordance with various embodiments.

FIG. 7 illustrates an exemplary computing platform disposed in a device configured to optimize processes for compressing media content in a media content management system 100 in accordance with various embodiments. In some examples, computing platform 700 may be used to implement computer programs, applications, methods, processes, algorithms, or other software to perform the above-described techniques.

In some cases, computing platform can be disposed in wearable device or implement, a mobile computing device 790b, or any other device, such as a computing device 790a.

Computing platform 700 includes a bus 704 or other communication mechanism for communicating information, which interconnects subsystems and devices, such as processor 706, system memory 710 (e.g., RAM, etc.), storage device 708 (e.g., ROM, etc.), a communication interface 712 (e.g., an Ethernet or wireless controller, a Bluetooth controller, etc.) to facilitate communications via a port on communication link 714 to communicate, for example, with a computing device, including mobile computing and/or communication devices with processors. Processor 706 can be implemented with one or more central processing units ("CPUs"), such as those manufactured by Intel® Corporation, or one or more virtual processors, as well as any combination of CPUs and virtual processors. Computing platform 700 exchanges data representing inputs and outputs via input-and-output devices 702, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 706 executing one or more sequences of one or more instructions stored in system memory 710, and computing platform 700 can be implemented in a client-server arrangement, peer-to-peer arrangement, or as any mobile computing device, including smart phones and the like. Such instructions or data may be read into system memory 710 from another computer readable medium, such as storage device 708. In some examples, hard-wired circuitry may be used in place of or in combination with software instructions for implementation. Instructions may be embedded in software or firmware. The term "computer readable medium" refers to any tangible medium that participates in providing instructions to processor 706 for execution. Such a medium may take many forms, including but not limited to, non-volatile media and volatile media. Non-volatile media includes, for example, optical or magnetic disks and the like. Volatile media includes dynamic memory, such as system memory 710.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 704 for transmitting a computer data signal.

In some examples, execution of the sequences of instructions may be performed by computing platform 700. According to some examples, computing platform 700 can be coupled by communication link 714 (e.g., a wired network, such as LAN, PSTN, or any wireless network, including WiFi of various standards and protocols, Blue Tooth®, Zig-Bee, etc.) to any other processor to perform the sequence of instructions in coordination with (or asynchronous to) one another. Computing platform 700 may transmit and receive messages, data, and instructions, including program code (e.g., application code) through communication link 714 and communication interface 712. Received program code may be executed by processor 706 as it is received, and/or stored in memory 710 or other non-volatile storage for later execution.

In the example shown, system memory 710 can include various modules that include executable instructions to implement functionalities described herein. System memory 710 may include an operating system ("O/S") 730, as well as an application 732 and/or logic module 750. In the example shown, system memory 710 includes a preprocessing module 106 including a color map module 308, a pixel color value analyzer module 310, and a color difference optimization module 312, a content validation module 118 including a candidate selection module 408 and a candidate selection interface module 410. The system memory 710 may also include a search interface module 124, a dynamic keyboard interface module 208, a dynamic keyboard presentation module 212, a content encoding optimization module 110 including a content parameter determining module 402, a content variation module 404, and a grid search optimization algorithm module 734. One or more of the modules included in memory 710 can be configured to provide or consume outputs to implement one or more functions described herein.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, a media content management system or one or more of its components, or any process or device described herein, can be in communication (e.g., wired or wirelessly) with a mobile device, such as a mobile phone or computing device, or can be disposed therein.

In some cases, a mobile device, or any networked computing device (not shown) in communication with an action alert controller or one or more of its components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figure can represent one or more algorithms. Or, at least one of the elements can represent a portion of logic including a portion of hardware configured to provide constituent structures and/or functionalities.

For example, a dynamic keyboard presentation module 212 or any of its one or more components, or any process or device described herein, can be implemented in one or more computing devices (i.e., any mobile computing device, such as a wearable device, an audio device (such as headphones or a headset) or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit.

For example, a media content management system, including one or more components, or any process or device described herein, can be implemented in one or more computing devices that include one or more circuits. Thus, at least one of the elements in the above-described figures can represent one or more components of hardware. Or, at least one of the elements can represent a portion of logic including a portion of circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A method comprising:
   receiving an uncompressed content item in an media content management system;
   determining one or more parameters associated with the uncompressed content item;
   generating, by a processor, a plurality of variants of the uncompressed content item using the one or more parameters, the plurality of variants including one or more compressed content items;
   determining a candidate set comprising at least one of the one or more compressed content items from the plurality of variants based on one or more filtering factors;
   selecting a validated compressed content item from the candidate set based on one or more validation criteria; and
   storing the validated compressed content item in a database in the media content management system, wherein:
   the uncompressed content item comprises a video file,
   the validated compressed content item comprises a graphics interchange format (GIF) file, and
   selecting the validated compressed content item from the candidate set based on the one or more validation criteria comprises determining the one or more validation criteria using a machine learning classifier that outputs an optimal set of parameter values of the one or more parameters.

2. The method of claim 1, wherein generating a plurality of variants of the uncompressed content item using the one or more parameters further comprises:
   using a grid search optimization algorithm to generate the plurality of variants based on the one or more parameters and a performance metric comprising a set of parameter values based on a previously validated content item.

3. The method of claim 1, wherein the one or more parameters associated with the uncompressed content item comprises a noise parameter.

4. The method of claim 1, wherein the one or more parameters associated with the uncompressed content item comprises a smoothness parameter.

5. The method of claim 1, wherein the one or more parameters associated with the uncompressed content item comprises a sharpness parameter.

6. The method of claim 1, wherein the one or more parameters associated with the uncompressed content item comprises a color fidelity parameter.

7. The method of claim 1, wherein the one or more filtering factors used to determine the candidate set comprises a file size threshold.

8. The method of claim 1, wherein the one or more filtering factors used to determine the candidate set comprises one or more visual quality standards, wherein the one or more visual quality standards comprise a range of quality scores based on at least one performance metric.

9. The method of claim 1, wherein generating the plurality of variants of the uncompressed content item further comprises:

generating a grid comprising the plurality of variants, each variant based on a unique combination of the one or more parameters.

10. The method of claim 9, wherein the candidate set comprising at least one of the one or more compressed content items is determined using a grid search optimization algorithm.

11. A method comprising:
receiving, in an media content management system, an uncompressed content item comprising a plurality of frames;
determining data representing a color map associated with the plurality of frames of the uncompressed content item;
generating, by a processor for each frame of the plurality of frames, a plurality of color values associated with a plurality of pixels of the each frame;
comparing, by the processor for each pixel in each frame of the plurality of frames, a subset of the plurality of color values to determine a color difference value;
determining data representing a new color map associated with the plurality of frames based on the color difference value associated with each pixel in each frame; and
storing the data representing the new color map in association with the uncompressed content item to form a compressed content item in a database in the media content management system.

12. The method of claim 11, wherein the data representing a color map associated with the plurality of frames is a metadata attribute of the uncompressed content item.

13. The method of claim 11, wherein the data representing a color map associated with the plurality of frames is determined based on an analysis of each frame.

14. The method of claim 11, wherein a color difference value is determined as a percentage change in color value among the subset of the plurality of color values associated with each pixel in each frame.

15. A system comprising:
a server configured to receive an uncompressed content item comprising a plurality of frames;
a preprocessing module configured to determine data representing a color map associated with the plurality of frames of the uncompressed content item, generate a plurality of color values associated with a plurality of pixels in the plurality of frames, and the preprocessing module further configured to determine data representing a new color map based on a plurality of color difference values using the plurality of color values;
a processor configured to determine one or more parameters associated with the uncompressed content item, to generate a plurality of variants of the uncompressed content item using the one or more parameters, the plurality of variants including one or more compressed content items, to determine a candidate set comprising at least one of the one or more compressed content items based on one or more filtering factors, and the processor further configured to select a validated compressed content item from the candidate set based on one or more validation criteria;: and
a database configured to store, by the processor, the validated compressed content item and the data representing the new color map in association with the uncompressed content item.

16. The system of claim 15, wherein the server is further configured to receive a search query, retrieve at least two compressed content items in the database, generate at least two renderings of the at least two compressed content items in animation in response to the received search query, and provide to display concurrently the at least two renderings of the at least two compressed content items in animation.

17. The system of claim 15, wherein the processor is further configured to determine the candidate set comprising at least one of the one or more compressed content items using a grid search optimization algorithm.

18. The system of claim 15, wherein the processor is further configured to generate the plurality of variants of the uncompressed content item by generating a grid comprising the plurality of variants, each variant based on a unique combination of the one or more parameters.

19. The system of claim 15, wherein the preprocessing module is further configured to determine a color difference value as a percentage change in color value among the subset of the plurality of color values associated with each pixel in each frame.

* * * * *